US011133499B2

United States Patent
Zheng et al.

(10) Patent No.: US 11,133,499 B2
(45) Date of Patent: Sep. 28, 2021

(54) SUBSTITUTED RAMSDELLITE MANGANESE DIOXIDES IN AN ALKALINE ELECTROCHEMICAL CELL

(71) Applicant: Energizer Brands, LLC, St. Louis, MO (US)

(72) Inventors: Guanghong Zheng, Westlake, OH (US); Andrew J. Barko, North Olmsted, OH (US); Chuze Ma, San Diego, CA (US); Bin Li, San Diego, CA (US); Julie Diana Goetz, La Verne, CA (US); Charlie Nguyen, San Jose, CA (US)

(73) Assignee: Energizer Brands, LLC, St. Louis, MO (US)

( * ) Notice: Subject to any disclaimer, the term of this patent is extended or adjusted under 35 U.S.C. 154(b) by 180 days.

(21) Appl. No.: 16/414,103

(22) Filed: May 16, 2019

(65) Prior Publication Data

US 2020/0365888 A1  Nov. 19, 2020

(51) Int. Cl.
| | |
|---|---|
| *H01M 4/50* | (2010.01) |
| *C01G 45/02* | (2006.01) |
| *H01M 4/38* | (2006.01) |
| *H01M 6/04* | (2006.01) |

(52) U.S. Cl.
CPC .............. *H01M 4/50* (2013.01); *C01G 45/02* (2013.01); *H01M 4/38* (2013.01); *H01M 6/04* (2013.01); *C01P 2002/52* (2013.01); *C01P 2006/40* (2013.01)

(58) Field of Classification Search
CPC .. C01G 45/02; C01P 2002/52; C01P 2006/40; H01M 4/38; H01M 4/50; H01M 6/04
See application file for complete search history.

(56) References Cited

U.S. PATENT DOCUMENTS

| | | | |
|---|---|---|---|
| 4,246,253 A | 1/1981 | Hunter | |
| 4,312,930 A | 1/1982 | Hunter | |
| 5,558,961 A * | 9/1996 | Doeff | H01M 4/505 429/224 |
| 8,303,840 B2 * | 11/2012 | Nanjundaswamy | H01M 6/06 252/182.1 |
| 2017/0104212 A1 * | 4/2017 | Tong | H01M 4/505 |

OTHER PUBLICATIONS

Landa-Medrano et al., "R-MnO2 nanourchins: a promising catalyst in Li—O2 batteries," Materials Research Society Symposium Proceedings, 1643:17-21, (2014).

Stosevski et al., "Highly crystalline ramsdellite as a cathode material for near-neutral aqueous MnO2/Zn batteries," Chemical Communications, 55(14):2082-2085, (2019).

(Continued)

Primary Examiner — Victoria H Lynch
(74) Attorney, Agent, or Firm — Alston & Bird LLP (57) ABSTRACT

Substituted ramsdellite manganese dioxide (R—MnO$_2$) compounds are provided, where a portion of the Mn is replaced by at least one alternative cation, or a portion of the O is replaced by at least one alternative anion. Electrochemical cells incorporating substituted R—MnO$_2$ into the cathode, as well as methods of preparing the substituted R—MnO$_2$, are also provided.

17 Claims, 3 Drawing Sheets (56) References Cited

OTHER PUBLICATIONS

WIPO Application No. PCT/US2020/033043, PCT International Search Report and Written Opinion of the International Searching Authority dated Aug. 6, 2020.

Larcher, D. et al., "Synthesis of $MnO_2$ Phases from $LiMn_2O_4$ in Aqueous Acidic Media: Mechanisms of Phase Transformations, Reactivity, and Effect of Bi Species," J. Electrochem. Soc., 145(10):3392-3400, (1998).

Wickham, D. G. et al., "Crystallographic and magnetic properties of several spinels containing trivalent ja-1044 manganese," Journal of Physics and Chemistry of Solids, 7(4):351-360, (1958).

* cited by examiner

SUBSTITUTED RAMSDELLITE MANGANESE DIOXIDES IN AN ALKALINE ELECTROCHEMICAL CELL

BACKGROUND

Alkaline electrochemical cells are commercially available in cell sizes commonly known as LR6 (AA), LR03 (AAA), LR14 (C) and LR20 (D). The cells have a cylindrical shape that must comply with the dimensional standards that are set by organizations such as the International Electrotechnical Commission. The electrochemical cells are utilized by consumers to power a wide range of electrical devices, for example, clocks, radios, toys, electronic games, film cameras generally including a flashbulb unit, as well as digital cameras. Such electrical devices possess a wide range of electrical discharge conditions, such as from low drain to relatively high drain. Due to the increased use of high drain devices, such as digital cameras, it is desirable for a manufacturer to produce a battery that possesses desirable high drain discharge properties.

As the shape and size of the batteries are often fixed, battery manufacturers must modify cell characteristics to provide increased performance. Attempts to address the problem of how to improve a battery's performance in a particular device, such as a digital camera, have usually involved changes to the cell's internal construction. For example, cell construction has been modified by increasing the quantity of active materials utilized within the cell.

Manganese dioxide ($MnO_2$) is a well-known substance commonly used in electrochemical cells, such as dry cell batteries, as an active cathode material. Manganese dioxide has been known to exist in various crystalline forms among which pyrolusite and nsutite are commonly found in nature. Ramsdellite (or "R—$MnO_2$") is also found in nature, but to a lesser extent.

$LiMn_2O_4$, a spinel, is reported by Wickham and Croft (D. G. Wickham & W. J. Croft, J. Phys. Chem. Solids, 7, 351 (1958)) to form whenever lithium carbonate and any oxide of manganese are taken in a 2:1 molar ratio of Mn/Li, and heated at 800°-900° C. in air. The product $LiMn_2O_4$ (a dark blue-colored material) contains equal amounts of Mn(III) and Mn(IV), and accordingly has a manganese peroxidation value of 75% (% peroxidation is defined as the degree to which the manganese oxidation state has been raised from Mn(II) to Mn(IV). Thus, MnO has 0% peroxidation and $MnO_2$ has 100% peroxidation). Wickham and Croft also reported that using excess Li in the reaction led to formation of a mixture of $LiMn_2O_4$ and $Li_2MnO_3$ (a red material), while excess Mn led to a mixture containing $Mn_2O_3$ in addition to the $LiMn_2O_4$. It should be noted that other preparative techniques are possible for preparing $LiMn_2O_4$, in addition to those described by Wickham and Croft. Other lithium or manganese compounds can be used as starting materials provided they decompose to lithium or manganese oxides under the reaction conditions used.

U.S. Pat. Nos. 4,246,253 and 4,312,930 relate to a purportedly new form of manganese dioxide and a method of preparing it. The manganese dioxide, made by acid treatment of $LiMn_2O_4$, is referred to as $\lambda$-$MnO_2$ (or "lambda $MnO_2$) and is purportedly "a substantially pure $MnO_2$ whose x-ray pattern is nearly identical to that of the starting material, $LiMn_2O_4$, a spinel."

One issue with chemically synthesized $\lambda$-$MnO_2$ is that it is unstable in aqueous solutions, such as an aqueous concentrated alkaline electrolyte solution, as found in an alkaline electrochemical cell, due to disproportionation. This limited its application in practical alkaline electrochemical cells. It is desirable to increase the stability of chemical manganese dioxide (CMD) while maintaining its electrochemical performance to increase battery energy and run-time.

Previous efforts to prepare improved $\lambda$-$MnO_2$ have included making substituted $\lambda$-$MnO_2$, in which at least one alternate cation is substituted for a portion of the Mn. This has included preparing substituted spinels.

It is in an effort to overcome the limitations of the above-described materials and cells, and other such cells, that the present embodiments were designed.

BRIEF SUMMARY

An embodiment is substituted R—$MnO_2$, having at least one alternate cation substituted for a portion of the Mn or at least one alternate anion substituted for a portion of the O.

An embodiment is a primary alkaline electrochemical cell, comprising:
 a) a container; and
 b) an electrode assembly disposed within the container and comprising a positive electrode, a negative electrode, a separator located between the positive electrode and the negative electrode, and an alkaline electrolyte,
  wherein the negative electrode comprises zinc, and
  wherein the positive electrode comprises substituted R—$MnO_2$.

An embodiment is a method of producing a substituted R—$MnO_2$, comprising
 i) providing a substituted $\lambda$-$MnO_2$; and
 ii) suspending the substituted $\lambda$-$MnO_2$ in aqueous acid, so as to produce the substituted R—$MnO_2$.

An embodiment is a method of producing a substituted R—$MnO_2$, comprising
 i) providing a substituted spinel; and
 ii) suspending the substituted spinel in aqueous acid, so as to produce the substituted R—$MnO_2$.

An embodiment is a substituted R—$MnO_2$ produced by such a method.

An embodiment is a primary alkaline electrochemical cell, comprising:
 a) a container; and
 b) an electrode assembly disposed within the container and comprising a positive electrode, a negative electrode, a separator located between the positive electrode and the negative electrode, and an alkaline electrolyte,
  wherein the positive electrode comprises substituted R—$MnO_2$ produced by such a method.

DETAILED DESCRIPTION AND DISCUSSION

Various embodiments now will be described more fully hereinafter with reference to the accompanying drawings, in which some, but not all embodiments are shown. Indeed, various embodiments may be embodied in many different forms and should not be construed as limited to the embodiments set forth herein; rather, these embodiments are provided so that this disclosure will satisfy applicable legal requirements. Like numbers refer to like elements throughout. In the following description, various components may be identified as having specific values or parameters, however, these items are provided as exemplary embodiments. Indeed, the exemplary embodiments do not limit the various aspects and concepts of the embodiments as many comparable parameters, sizes, ranges, and/or values may be implemented. The terms "first," "second," and the like, "primary," "exemplary," "secondary," and the like, do not denote any order, quantity, or importance, but rather are used to distinguish one element from another. Further, the terms "a," "an," and "the" do not denote a limitation of quantity, but rather denote the presence of "at least one" of the referenced item.

Each embodiment disclosed herein is contemplated as being applicable to each of the other disclosed embodiments. All combinations and sub-combinations of the various elements described herein are within the scope of the embodiments.

It is understood that where a parameter range is provided, all integers and ranges within that range, and tenths and hundredths thereof, are also provided by the embodiments. For example, "5-10%" includes 5%, 6%, 7%, 8%, 9%, and 10%; 5.0%, 5.1%, 5.2% . . . 9.8%, 9.9%, and 10.0%; and 5.00%, 5.01%, 5.02% . . . 9.98%, 9.99%, and 10.00%, as well as, for example, 6-9%, 5.1%-9.9%, and 5.01%-9.99%.

As used herein, "about" in the context of a numerical value or range means within ±10% of the numerical value or range recited or claimed.

As used herein, "synergistic," in terms of an effect, refers to the case where a substituted R—$MnO_2$ comprising two alternate cations (M1 and M2) exhibits a greater improvement in specific capacity, or some other property or metric of performance, compared to unsubstituted R—$MnO_2$, than would be expected based on the improvements exhibited by two substituted R-$MnO_2$s, one comprising M1 and one comprising M2.

As used herein, "improvement" with respect to capacity or specific capacity means that the capacity or specific capacity is increased. Generally, an "improvement" of a property or metric of performance of a material or electrochemical cell means that the property or metric of performance differs (compared to that of a different material or electrochemical cell) in a manner that a user or manufacturer of the material or cell would find desirable (i.e. costs less, lasts longer, provides more power, more durable, etc.).

As used herein, "alternate cation" or "manganese substituent" refers to an element substituted for a portion of the Mn in a substituted R—$MnO_2$, as well as during the manufacture and use thereof. Where the alternate cation may be a metalloid, this refers to the group including the elements B, Si, Ge, As, Sb, Te, Po, At, Se, and C. "Alternate anion" or "anion substituent" ("AS") refers to an element substituted for a portion of the O in a substituted R—$MnO_2$, as well as during the manufacture and use thereof.

As used herein, when two species are "isoelectronic" to each other, they have the same number of valence electrons. As examples, $S^{2-}$, $F^-$, and $N^{3-}$ are all isoelectronic to $O^{2-}$ and to each other. Thus, the elements S, F, and N may be isoelectronic to $O^{2-}$.

As used herein, "halogen" refers to the elements in group VIIA (17) of the periodic table. Example halogens are fluorine, bromine, chlorine, and iodine.

As used herein, "specific capacity" refers to the total amount of charge in an active material when discharged at a particular rate. This is typically measured in ampere hours per gram of active material. As used herein, "capacity" refers to the total amount of charge in an electrochemical cell when discharged at a particular rate. This is typically measured in ampere hours.

As used herein, "run-time" refers to the length of time that an electrochemical cell will be able to provide a certain level of charge.

For chemical formulas comprising a component having a subscript of 0, it will be understood that that component is not present in the formula. For example, in the formula $(Mn_{1-x}M_x)O_{2-w}AS_t$, where t=0, AS is not present.

An embodiment is substituted R—$MnO_2$, having at least one alternate cation substituted for a portion of the Mn or at least one alternate anion substituted for a portion of the O.

In an embodiment, the substituted R—$MnO_2$ has the formula $(Li_{1-v}A_v)_z(Mn_{1-x}M_x)O_{2-(w/2)}AS_{(t/2)}$, wherein x≤0.5, v≤0.1, z≤0.10, and t≤w≤0.2, wherein M is the alternate cation, wherein A is an alkali metal, and wherein AS is the alternate anion, and is S, F, N, a halogen, or any element that can be isoelectronic to $O^{2-}$, if present.

In an embodiment, the substituted R—$MnO_2$ has the formula $(Li_{1-v}A_v)_z(Mn_{1-x-y}M1_xM2_y)O_{2-(w/2)}AS_{(t/2)}$, wherein 0<(x+y)≤0.5, v≤0.1, z≤0.10, and t≤w≤0.2, wherein M1 and M2 are each an alternate cation, wherein M1 is different from M2, wherein A is an alkali metal, and wherein AS is S, F, N, a halogen, or any element that can be isoelectronic to $O^{2-}$, if present.

In a further embodiment, z≤0.05.

In a further embodiment, 3 or more alternate cations are substituted for portions of the Mn.

In an embodiment, each alternate cation, if present, is selected from the group consisting of Al, B, Co, Cr, Cu, Fe, Ga, Li, Nb, Ni, Mg, Ru, Ti, V, and Zn, and A is selected from the group consisting of Na, K, Rb, and Cs.

In an embodiment, each alternate cation can exist in an octahedral coordination environment of oxygen, supports M-O bonds of about 1.8 to 2.2 Å, and has an oxidation state that allows charge neutrality of the R—$MnO_2$.

An embodiment is a primary alkaline electrochemical cell, comprising:
  a) a container; and
  b) an electrode assembly disposed within the container and comprising a positive electrode, a negative electrode, a separator located between the positive electrode and the negative electrode, and an alkaline electrolyte,
  wherein the negative electrode comprises zinc, and
  wherein the positive electrode comprises the substituted R—$MnO_2$ of any of the above embodiments.

In a further embodiment, the capacity or runtime of the primary alkaline electrochemical cell is greater than that of a similar primary alkaline electrochemical cell comprising unsubstituted R—$MnO_2$, substituted or unsubstituted λ-$MnO_2$, or EMD in its positive electrode.

In a further embodiment, the capacity or runtime is from ≥1% greater to ≥32% greater, or from ≥5% greater to ≥25% greater, or from ≥10% greater to ≥20% greater, or from 1% greater to 100% greater, or from 5% greater to 90% greater, or from 10% greater to 80% greater, or from 15% greater to 70% greater, or from 20% greater to 60% greater, or from 25% greater to 50% greater, or from 30% greater to 40% greater.

In a further embodiment, the capacity is between 267-359 (mAh/g to 0.9V), or between 285-350 (mAh/g to 0.9V), or between 295-340 (mAh/g to 0.9V), or between 305-335 (mAh/g to 0.9V), or between 315-330 (mAh/g to 0.9V), or between 320-325 (mAh/g to 0.9V).

An embodiment is a method of producing a substituted R—$MnO_2$, comprising i) providing a substituted λ-$MnO_2$; and ii) suspending the substituted λ-$MnO_2$ in aqueous acid, so as to produce the substituted R—$MnO_2$.

In an embodiment, the substituted λ-$MnO_2$ has the formula $(Li_{1-v}A_v)_z(Mn_{1-x}M_x)O_{2-(w/2)}AS_{(t/2)}$, wherein $x \leq 0.5$, $v \leq 0.1$, $z' \leq 0.05$, and $t \leq w \leq 0.2$; and wherein M is selected from the group consisting of Al, B, Co, Cr, Cu, Fe, Ga, Li, Nb, Ni, Mg, Ru, Ti, V, and Zn, A is selected from the group consisting of Na, K, Rb, and Cs, and AS is selected from the group consisting of S, F, N, and halogens.

As the transition from lambda $MnO_2$ to ramsdellite $MnO_2$ typically occurs under harsh conditions (such as increased time, temperature, or acid concentration), more alkali metal (Li and A) will be leached out. Therefore, the value of z in the ramsdellite $MnO_2$ is usually, but does not have to be, smaller than the value of z' (z prime) in the lambda $MnO_2$.

In a further embodiment, the method further comprises suspending a spinel having the chemical formula $(Li_{1-v}A_v)(Mn_{2-2x}M_{2x})O_{4-w}AS_t$ in aqueous acid, so as to produce the substituted λ-$MnO_2$.

In another embodiment, the substituted λ-$MnO_2$ has the formula $(Li_{1-v}A_v)_z(Mn_{1-x-y}M1_xM2_y)O_{2-(w/2)}AS_{(t/2)}$, wherein $0 < (x+y) \leq 0.5$, $v \leq 0.1$, $z' \leq 0.10$, and $t \leq w \leq 0.2$, wherein M1 and M2 are each an alternate cation, wherein M1 is different from M2, wherein A is an alkali metal, and wherein AS is selected from the group consisting of S, F, N, and halogens.

In a further embodiment, the method further comprises suspending a spinel having the chemical formula $(Li_{1-v}A_v)(Mn_{2-2x-2y}M1_{2x}M2_{2y})O_{4-w}AS_t$ in aqueous acid, so as to produce the substituted λ-$MnO_2$.

In an embodiment, the substituted R—$MnO_2$ has the formula $(Li_{1-v}A_v)_z(Mn_{1-x}M_x)O_{2-(w/2)}AS_{(t/2)}$, wherein $x \leq 0.5$, $v \leq 0.1$, $z \leq 0.05$, and $t \leq w \leq 0.2$; and wherein M is selected from the group consisting of Al, B, Co, Cr, Cu, Fe, Ga, Li, Nb, Ni, Mg, Ru, Ti, V, and Zn, A is selected from the group consisting of Na, K, Rb, and Cs, and AS is selected from the group consisting of S, F, N, and halogens.

In an embodiment, the substituted R—$MnO_2$ has the formula $(Li_{1-v}A_v)_z(Mn_{1-x-y}M1_xM2_y)O_{2-(w/2)}AS_{(t/2)}$, wherein $0 < (x+y) \leq 0.5$, $v \leq 0.1$, $z \leq 0.10$, and $t \leq w \leq 0.2$, wherein M1 and M2 are each an alternate cation, wherein M1 is different from M2, wherein A is an alkali metal, and wherein AS is selected from the group consisting of S, F, N, and halogens.

An embodiment is a method of producing a substituted R—$MnO_2$, comprising i) providing a substituted spinel; and ii) suspending the substituted spinel in aqueous acid, so as to produce the substituted R—$MnO_2$.

In an embodiment, the substituted spinel has the formula $(Li_{1-v}A_v)(Mn_{2-2x}M_{2x})O_{4-w}AS_t$, wherein $x \leq 0.5$, $v \leq 0.1$, and $t \leq w \leq 0.2$; and wherein M is selected from the group consisting of Al, B, Co, Cr, Cu, Fe, Ga, Li, Nb, Ni, Mg, Ru, Ti, V, and Zn, A is selected from the group consisting of Na, K, Rb, and Cs, and AS is selected from the group consisting of S, F, N, and halogens.

In an embodiment, the substituted spinel has the formula $(Li_{1-v}A_v)(Mn_{2-2x-2y}M1_{2x}M2_{2y})O_{4-w}AS_t$, wherein $0 < (x+y) \leq 0.5$, $v \leq 0.1$, and $t \leq w \leq 0.2$, wherein M1 and M2 are each an alternate cation, wherein M1 is different from M2, wherein A is an alkali metal, and wherein AS is selected from the group consisting of S, F, N, and halogens.

In an embodiment, the substituted R—$MnO_2$ has the formula $(Li_{1-v}A_v)_z(Mn_{1-x}M_x)O_{2-(w/2)}AS_{(t/2)}$, wherein $x \leq 0.5$, $v \leq 0.1$, $z \leq 0.05$, and $t \leq w \leq 0.2$; and wherein M is selected from the group consisting of Al, B, Co, Cr, Cu, Fe, Ga, Li, Nb, Ni, Mg, Ru, Ti, V, and Zn, A is selected from the group consisting of Na, K, Rb, and Cs, and AS is selected from the group consisting of S, F, N, and halogens.

In an embodiment, the substituted R—$MnO_2$ has the formula $(Li_{1-v}A_v)_z(Mn_{1-x-y}M1_xM2_y)O_{2-(w/2)}AS_{(t/2)}$, wherein $0 < (x+y) \leq 0.5$, $v \leq 0.1$, $z \leq 0.10$, and $t \leq w \leq 0.2$, wherein M1 and M2 are each an alternate cation, wherein M1 is different from M2, wherein A is an alkali metal, and wherein AS is selected from the group consisting of S, F, N, and halogens.

In embodiments, each suspension, independently, is performed for at least 5, at least 6, at least 7, at least 8, at least 9, at least 10, at least 11, at least 12, at least 13, at least 14, at least 15, or at least 16 hours.

In an embodiment, each aqueous acid, independently, has a concentration of 1.0-18 M acid.

In an embodiment, each suspension, independently, occurs at a temperature of 25° C.-105° C.

In an embodiment, the temperature of the acid changes during the suspension.

In an embodiment, each aqueous acid, independently, is selected from the group consisting of sulfuric acid, phosphoric acid, nitrous acid, methanoic acid, hydrofluoric acid, hydrochloric acid, nitric acid, chloric acid, and perchloric acid.

An embodiment is a substituted R—$MnO_2$ produced by any of these methods.

An embodiment is a primary alkaline electrochemical cell, comprising:

a) a container; and b) an electrode assembly disposed within the container and comprising a positive electrode, a negative electrode, a separator located between the positive electrode and the negative electrode, and an alkaline electrolyte, wherein the positive electrode comprises substituted R—$MnO_2$ produced by any of these methods.

In an embodiment, the substituted R—$MnO_2$ comprises lithium. In a further embodiment, the substituted R—$MnO_2$ comprises lithium and an alkali metal. In a further embodiment, the alkali metal is selected from the group consisting of Na, K, Rb, and Cs.

In an embodiment, the substituted R—$MnO_2$ comprises oxygen vacancies. In an embodiment, the substituted R—$MnO_2$ comprises an anion substituent. In a further embodiment, the anion substituent is selected from the group consisting of S, F, N, and halogens.

Electrolytic manganese dioxide (EMD) is the most common phase used as the cathode active material in alkaline Zn/$MnO_2$ batteries. It exhibits good discharge characteristics during the homogeneous reduction of $MnO_2$ (EMD) to MnOOH. As the proportion of MnOOH in the cathode approaches 100%, it becomes more soluble in the electrolyte and the $Mn^{+3}$ concentration in solution rises. In a battery there is also zinc (e.g., within the anode), in the discharged form of zincate, $Zn(OH)_4^{2-}$. These two species (zincate and $Mn^{+3}$) react to form the inert compound hetaerolite, $ZnMn_2O_4$, which precipitates, essentially stopping any further electrochemical activity for that manganese, which could otherwise produce another electron discharge and be further reduced (to $Mn^{+2}$). Battery life (run-time) could be extended, especially for low drain applications, if the hetaerolite reaction could be slowed or eliminated. Another benefit to extending the discharge life/run-time could be the lessening or elimination of leakage associated with deep discharge of batteries by providing more reducible Mn, thus enabling a higher discharge of the anode active material.

Alternate forms of $MnO_2$ may provide more than one electron discharge and thus greater capacity/run-time.

R—$MnO_2$, where a portion of the Mn is substituted with one or more alternate cations at various levels, or a portion of the O is substituted with one or more alternate anions (substituted R—$MnO_2$), results in a material that has longer run-time and greater stability in KOH electrolyte. In principle, all cations that can exist in an octahedral coordination environment of oxygen, support M-O bonds of about 1.8 to 2.2 Å, and have an oxidation state that allows charge neutrality of the spinel, could feasibly be incorporated into the structure to replace a portion of the Mn. In addition, all anions that can be isoelectronic to $O^{2-}$ may be used to replace a portion of the O.

The alternate cation may be, but is not limited to, Al, B, Co, Cr, Cu, Fe, Ga, Li, Nb, Ni, Mg, Ru, Ti, V, or Zn. The alternate cation may be inert (such as Al, B, Cr, Ga, Li, Mg, or Ti) or potentially electroactive (such as Co, Cu, Fe, Ni, Ru, V, or Zn). In a preferred embodiment, the alternate cation is Ti. The concentration, x, of alternate cation M can range from 0-0.5. Substituted R materials are made from, for example, the lithiated spinel $(Li_{1-v}A_v)(Mn_{1-x}M_x)_2O_{4-w}AS_t$. Some trace levels of lithium may remain after the formation of the ramsdellite phase. For example, $LiMn_{1.75}Ti_{0.25}O_4$ may be converted to the R phase $Li_{0.03}(Mn_{0.87}Ti_{0.13})O_2$.

The synthesis of R—$MnO_2$ is a two-step process. The first step is a solid state reaction between manganese (III) oxide and lithium carbonate. The starting materials, in the correct stoichiometry, are intimately mixed and then heated at 850° C. for 16 hours. The resultant product is the spinel phase $LiMn_2O_4$. The $LiMn_2O_4$ is then suspended in an aqueous solution of 2.5M sulfuric acid for 16 hours at elevated temperature. This hot acid wash step leaches out most of the lithium, leaving a spinel $Li_zMnO_2$ (z<0.10). This is R—$MnO_2$. If room temperature acid is used in the previous step, a different form of $MnO_2$ ($\lambda$-$MnO_2$) is formed. The temperature of the hot acid for the phase change will depend upon the acid types, acid concentration and acid wash time. Furthermore, with elemental substitution in the precursor $(Li_{1-v}A_v)(Mn_{1-x}M_x)_2O_{4-w}AS_t$, the hot acid wash temperature resulting in the phase change will also depend upon the substituting elements and percentage of the substitution in addition to the acid types, acid concentration and acid wash time.

There may be substituted R—$MnO_2$ which comprises more than one manganese substituent (alternate cation). For example, a substituted R—$MnO_2$ which comprises two alternate cations, M1 and M2, would have the formula $(Li_{1-v}A_v)_zMn_{1-x-y}M1_xM2_yO_{2-(w/2)}AS_{(t/2)}$, wherein 0<(x+y)≤0.5, v≤0.1, z≤0.05, and t≤w≤0.2, and AS is S, F, N, or any element that can be isoelectronic to $O^{2-}$. More than one anion substituent (AS) may also be present (for example, a portion of the oxygen may be replaced by fluorine, and another portion of the oxygen may be replaced by sulfur).

In the examples that follow, it was unexpectedly found that electrochemical cells comprising substituted R—$MnO_2$ in the cathode exhibited superior properties, such as capacity or insolubility in electrolyte solution, compared to similar electrochemical cells comprising unsubstituted $\lambda$-$MnO_2$ or EMD in the cathode.

Figure 1:
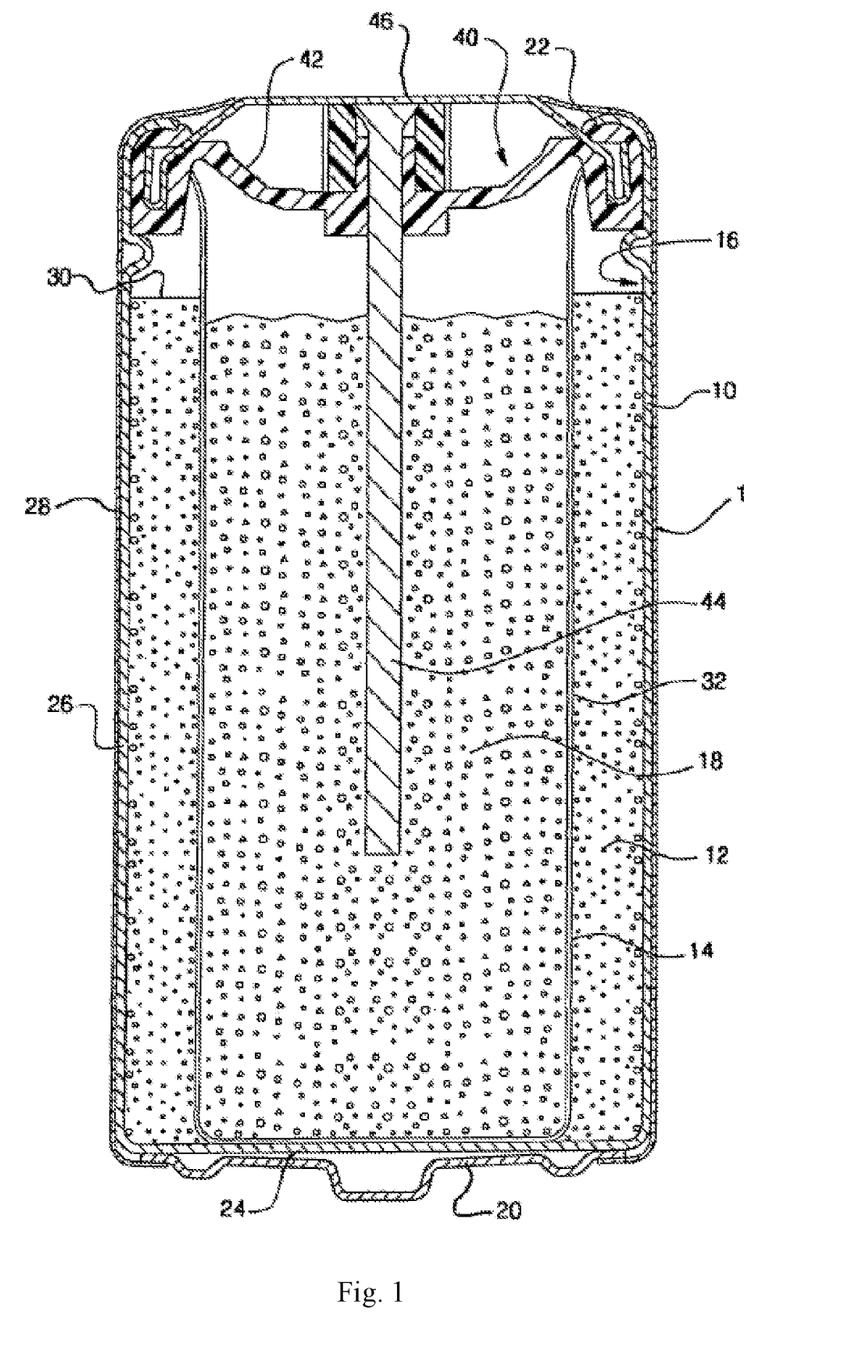
FIG. 1 is a cross-sectional elevational view of an alkaline electrochemical cell of an embodiment.

The embodiments will be better understood by reference to FIG. 1 which shows a cylindrical cell 1 in elevational cross-section, with the cell having a nail-type or bobbin-type construction and dimensions comparable to a conventional LR6 (AA) size alkaline cell, which is particularly well-suited to the embodiments. However, it is to be understood that cells according to the embodiments can have other sizes and shapes, such as a prismatic or button-type shape; and electrode configurations, as known in the art. The materials and designs for the components of the electrochemical cell illustrated in FIG. 1 are for the purposes of illustration, and other materials and designs may be substituted.

In FIG. 1, an electrochemical cell 1 is shown, including a container or can 10 having a closed bottom end 24, a top end 22 and sidewall 26 therebetween. The closed bottom end 24 includes a terminal cover 20 including a protrusion. The can 10 has an inner wall 16. In the embodiment, a positive terminal cover 20 is welded or otherwise attached to the bottom end 24. In one embodiment, the terminal cover 20 can be formed with plated steel for example with a protruding nub at its center region. Container 10 can be formed of a metal, such as steel, preferably plated on its interior with nickel, cobalt and/or other metals or alloys, or other materials, possessing sufficient structural properties that are compatible with the various inputs in an electrochemical cell. A label 28 can be formed about the exterior surface of container 10 and can be formed over the peripheral edges of the positive terminal cover 20 and negative terminal cover 46, so long as the negative terminal cover 46 is electrically insulated from container 10 and positive terminal 20.

Disposed within the container 10 are a first electrode 18 and second electrode 12 with a separator 14 therebetween. First electrode 18 is disposed within the space defined by separator 14 and closure assembly 40 secured to open end 22 of container 10. Closed end 24, sidewall 26, and closure assembly 40 define a cavity in which the electrodes of the cell are housed.

Closure assembly 40 comprises a closure member 42 such as a gasket, a current collector 44 and conductive terminal 46 in electrical contact with current collector 44. Closure member 42 preferably contains a pressure relief vent that will allow the closure member to rupture if the cell's internal pressure becomes excessive. Closure member 42 can be formed from a polymeric or elastomer material, for example Nylon-6,6, an injection-moldable polymeric blend, such as polypropylene matrix combined with poly(phenylene oxide) or polystyrene, or another material, such as a metal, provided that the current collector 44 and conductive terminal 46 are electrically insulated from container 10 which serves as the current collector for the second electrode 12. In the embodiment illustrated, current collector 44 is an elongated nail or bobbin-shaped component. Current collector 44 is made of metal or metal alloys, such as copper or brass, conductively plated metallic or plastic collectors or the like. Other suitable materials can be utilized. Current collector 44 is inserted through a preferably centrally located hole in closure member 42.

First electrode 18 is preferably a negative electrode or anode. The negative electrode includes a mixture of one or more active materials, an electrically conductive material, solid zinc oxide, and a surfactant. The negative electrode can optionally include other additives, for example a binder or a gelling agent, and the like.

Zinc is the preferred main active material for the negative electrode of the embodiments. Preferably, the volume of zinc utilized in the negative electrode is sufficient to maintain a desired particle-to-particle contact and a desired anode to cathode (A:C) ratio. The volume of zinc in the negative electrode can range from about 20 to about 30 volume percent, more preferably about 24 to about 28 volume percent. Notably, the solids packing of the negative electrode mix remains relatively unchanged from previously known designs, despite a lower overall concentration of zinc, because the relative volume contributions by the zinc and the zinc oxide are similar. The volume percent zinc is determined by dividing the volume of zinc by the volume of the negative electrode just prior to dispensing the negative electrode into the separator lined cavity as will be explained below. The volume percent zinc must be determined before dispensing the negative electrode into the separator basket because a portion of the electrolyte incorporated into the negative electrode migrates into the separator and cathode as soon as the negative electrode is inserted into the cavity defined by the separator. The volume percent zinc is based on the density of zinc (7.13 g/cc), the volume of the negative electrode mix and the weight of the negative electrode mix.

Particle-to-particle contact should be maintained during the useful life of the battery. If the volume of zinc in the negative electrode is too low, the cell's voltage may suddenly drop to an unacceptably low value when the cell is powering a device. The voltage drop is believed to be caused by a loss of continuity in the conductive matrix of the negative electrode. The conductive matrix can be formed from undischarged zinc particles, conductive electrochemically formed zinc oxide, or a combination thereof. A voltage drop can occur after zinc oxide has started to form, but before a sufficient network is built to bridge between all zinc particles present. Therefore, as the zinc reacts, eventually there is not enough zinc to form a continuous network, but there may not be enough zinc oxide to bridge the remaining zinc particles. As more electrochemical zinc oxide is formed, the conductive matrix can reform as zinc oxide is less dense than zinc and takes up more space, thereby bridging the zinc particles. If the voltage remains low, the cell must be replaced by the consumer. If the voltage quickly recovers to an acceptable value, the device may resume working in a normal manner. However, the consumer could incorrectly perceive that the temporary interruption in the device's performance is a sign that the battery is about to expire and may be motivated to replace the cell prematurely. Relatively higher concentrations of zinc can create reduction in the amounts of solid zinc oxide that can be utilized leading to reduced DSC (digital still camera) service, or gelled electrolyte leading to high viscosities and yield stresses causing negative electrode dispensing difficulties. Lower concentrations of zinc can cause lower service on substantially all rate tests due to the decreased presence of active material.

Zinc suitable for use in the embodiments may be purchased from a number of different commercial sources under various designations, such as BIA 100, BIA 115. Umicore, S. A., Brussels, Belgium is an example of a zinc supplier. In a preferred embodiment, the zinc powder generally has 25 to 40 percent fines less than 75 μm, and preferably 28 to 38 percent fines less than 75 μm. Generally lower percentages of fines will not allow desired DSC service to be realized and utilizing a higher percentage of fines can lead to increased gassing. A correct zinc alloy is needed in order to reduce negative electrode gassing in cells and to maintain test service results.

The amount of zinc present in the negative electrode ranges generally from about 62 to about 70 weight percent, desirably from about 64 to about 68 weight percent, and preferably about 65 to about, 66 weight percent based on the total weight of the negative electrode, i.e., zinc, solid zinc oxide, surfactant and gelled electrolyte.

Solid zinc oxide is present in the negative electrode of the embodiments. It has been found that the solid zinc oxide and water soluble block copolymer surfactant as described herein are synergists and significantly improve DSC service when compared to an electrochemical cell including a negative electrode without the solid zinc oxide and surfactant. The solid zinc oxide and surfactant do not appreciably impair relatively lower rate service, if at all. The solid zinc oxide is present in the negative electrode in an amount from about 1.5 to about 5 weight percent, and preferably from about 2 to about 3 weight percent based on the total weight of the negative electrode. The volume of solid zinc oxide is preferably from about 1 to about 2 volume percent based on the total volume of the negative electrode. A higher concentration of solid zinc oxide will increase high rate service, such as DSC service, but also increase negative electrode viscosity and yield stress which can create negative electrode dispensing problems. Lower concentrations of solid zinc oxide will decrease high rate DSC service.

The solid zinc oxide utilized in the embodiments is preferably highly active in order to increase high rate service, such as DSC service, as well as to increase anode rheology and reduce DSC service variability. The amount of active solid zinc oxide is generally greater than 90 percent and preferably greater than 95 percent based on the total weight of the solid zinc oxide present in the anode composition.

The solid zinc oxide added to the anode preferably has high purity and includes low levels of impurities that can result in higher zinc gassing and lowered service. The solid zinc oxide preferably contains less than 30 ppm iron, less than 3 ppm of silver and arsenic, less than 1 ppm of each of copper, nickel, chromium and cadmium, less than 0.50 ppm each of molybdenum, vanadium and antimony, less than 0.1 ppm tin and less than 0.05 ppm germanium.

A surfactant that is either a nonionic or anionic surfactant, or a combination thereof is present in the negative electrode. It has been found that anode resistance is increased during discharge by the addition of solid zinc oxide alone, but is mitigated by the addition of the surfactant. The addition of the surfactant increases the surface charge density of the solid zinc oxide and lowers anode resistance as indicated above. Use of a surfactant is believed to aid in forming a more porous discharge product when the surfactant adsorbs on the solid zinc oxide. When the surfactant is anionic, it carries a negative charge and, in alkaline solution, surfactant adsorbed on the surface of the solid zinc oxide is believed to change the surface charge density of the solid zinc oxide particle surfaces. The adsorbed surfactant is believed to cause a repulsive electrostatic interaction between the solid zinc oxide particles. It is believed that the surfactant reduces anode resistance increase caused by the addition of solid zinc oxide because the absorbed surfactant on solid zinc oxide results in enhanced surface charge density of solid zinc oxide particle surface. The higher the BET surface area of solid zinc oxide, the more surfactant can be adsorbed on the solid zinc oxide surface.

The preferred surfactant is DISPERBYK-190 from BYK-Chemie GmbH of Wesel, Germany. The surfactant is present in an amount sufficient to disperse the solid zinc oxide, preferably about 0.00064 to about 0.20 weight percent or more, based on the total weight of the negative electrode. DISPERBYK-190 is believed to be a solution including a water soluble, high molecular weight block copolymer including one or more functional groups, believably at least two different types of functional groups. The surfactant has an anionic/nonionic character due to the respective functional groups thereof. It is further believed that the number average molecular weight of a block copolymer DISPERBYK-190 is greater than 1000 measured utilizing gel permeation chromatography. Water solubility may be offset by the presence of a hydrophobic component if present in the electrode composition. In one embodiment, the surfactant is utilized in an amount from about 10 to about 100 ppm and preferably from about 15 to about 50 ppm of zinc utilized in the negative electrode. It is believed that DISPERBYK-190 does not contain any organic solvents and is, therefore, suitable for aqueous systems. DISPERBYK-190 has an acid value in mg KOH/g of 10 and a density of 1.06 g/ml at 20° C.

The aqueous alkaline electrolyte comprises an alkaline metal hydroxide such as potassium hydroxide, sodium hydroxide, or the like, or mixtures thereof. Potassium hydroxide is preferred. The alkaline electrolyte used to form the gelled electrolyte of the negative electrode contains the alkaline metal hydroxide in an amount from about 26 to about 36 weight percent, desirably from about 26 to about 32 weight percent, and preferably from about 26 to about 30 weight percent based on the total weight of the alkaline electrolyte. Interaction takes place between the negative electrode alkaline metal hydroxide and the added solid zinc oxide, and it has been found that lower alkaline metal hydroxide improves DSC service. Electrolytes which are less alkaline are preferred, but can lead to rapid electrolyte separation of the anode. Increase of alkaline metal hydroxide concentration creates a more stable anode, but can reduce DSC service.

A gelling agent is preferably utilized in the negative electrode as is well known in the art, such as a crosslinked polyacrylic acid, such as Carbopol® 940, which is available from Noveon, Inc. of Cleveland, Ohio, USA. Carboxymethylcellulose, polyacrylamide and sodium polyacrylate are examples of other gelling agents that are suitable for use in an alkaline electrolyte solution. Gelling agents are desirable in order to maintain a substantially uniform dispersion of zinc and solid zinc oxide particles in the negative electrode. The amount or gelling agent present is chosen so that lower rates of electrolyte separation are obtained and anode viscosity in yield stress are not too great which can lead to problems with anode dispensing.

Other components which may be optionally present within the negative electrode include, but are not limited to, gassing inhibitors, organic or inorganic anticorrosive agents, plating agents, binders or other surfactants. Examples of gassing inhibitors or anticorrosive agents can include indium salts, such as indium hydroxide, perfluoroalkyl ammonium salts, alkali metal sulfides, etc. In one embodiment, dissolved zinc oxide is present preferably via dissolution in the electrolyte, in order to improve plating on the bobbin or nail current collector and to lower negative electrode shelf gassing. The dissolved zinc oxide added is separate and distinct from the solid zinc oxide present in the anode composition. Levels of dissolved zinc oxide in an amount of about 1 weight percent based on the total weight of the negative electrode electrolyte are preferred in one embodiment. The soluble or dissolved zinc oxide generally has a BET surface area of about 4 $m^2/g$ or less measured utilizing a Tristar 3000 BET specific surface area analyzer from Micrometrics having a multi-point calibration after the zinc oxide has been degassed for one hour at 150° C.; and a particle size D50 (mean diameter) of about 1 micron, measured using a CILAS particle size analyzer as indicated above. In a further embodiment, sodium silicate in an amount of about 0.3 weight percent based on the total weight of the negative electrode electrolyte is preferred in the negative electrode in order to substantially prevent cell shorting through the separator during cell discharge.

The negative electrode can be formed in a number of different ways as known in the art. For example, the negative electrode components can be dry blended and added to the cell, with alkaline electrolyte being added separately or, as in a preferred embodiment, a pre-gelled negative electrode process is utilized.

In one embodiment, the zinc and solid zinc oxide powders, and other optional powders other than the gelling agent, are combined and mixed. Afterwards, the surfactant is introduced into the mixture containing the zinc and solid zinc oxide. A pre-gel comprising alkaline electrolyte, soluble zinc oxide and gelling agent, and optionally other liquid components, are introduced to the surfactant, zinc and solid zinc oxide mixture which are further mixed to obtain a substantially homogenous mixture before addition to the cell. Alternatively, in a further preferred embodiment, the solid zinc oxide is predispersed in a negative electrode pre-gel comprising the alkaline electrolyte, gelling agent, soluble zinc oxide and other desired liquids, and blended, such as for about 15 minutes. The solid zinc oxide and surfactant are then added and the negative electrode is blended for an additional period of time, such as about 20 minutes. The amount of gelled electrolyte utilized in the negative electrode is generally from about 25 to about 35 weight percent, and preferably about 32 weight percent based on the total weight of the negative electrode. Volume percent of the gelled electrolyte is preferably about 70% based on the total volume of the negative electrode. In addition to the aqueous alkaline electrolyte absorbed by the gelling agent during the negative electrode manufacturing process, an additional quantity of an aqueous solution of alkaline metal hydroxide, i.e., "free electrolyte", may also be added to the cell during the manufacturing process. The free electrolyte may be incorporated into the cell by disposing it into the cavity defined by the positive electrode or negative electrode, or combinations thereof. The method used to incorporate free electrolyte into the cell is not critical provided it is in contact with the negative electrode, positive electrode, and separator. In one embodiment, free electrolyte is added both prior to addition of the negative electrode mixture as well as after addition. In one embodiment, about 0.97 grams of 29 weight percent KOH solution is added to an LR6 type cell as free electrolyte, with about 0.87 grams added to the separator lined cavity before the negative electrode is inserted. The remaining portion of the 29 weight percent KOH solution is injected into the separator lined cavity after the negative electrode has been inserted.

The negative electrode suitable for use in the embodiments after degassing has a negative electrode density generally from about 96 to 100 percent, preferably from about 98 to 100 percent, calculated by dividing the actual weight over actual volume by the theoretical weight over actual volume. The addition of the solid zinc oxide to the negative electrode provides for increased viscosity of the gelled negative electrode prior to addition to the cell. Negative electrode viscosity ranges generally from about 70,000 to about 100,000 cps, and preferably from about 70,000 to about 95,000 cps for an LR6 type cell. As negative electrode viscosity is relatively high when compared with other negative electrode mixes, processing conditions can be optimized, such as by reducing cell throughput or processing speed, balancing negative electrode dispensing rate, and nozzle pull-out rate, for example. Pump size, piston outer diameter, and nozzle inner diameter as well as pump timing and pump stroke speed can influence dispensing of the negative electrode into the container. The weight of the negative electrode ranges generally from about 6 to about 7 grams, desirably from about 6.3 to about 6.7 grams, and preferably from about 6.37 to about 6.61 grams for an LR6 type cell.

Second electrode 12, also referred to herein as the positive electrode or cathode, includes substituted R—$MnO_2$ as the electrochemically active material. Substituted R—$MnO_2$ is present in an amount generally from about 90 to about 96 weight percent and preferably from about 93 to 95 weight percent by weight based on the total weight of the positive electrode, i.e., substituted R—$MnO_2$, conductive material, positive electrode electrolyte and additives such as barium sulfate. The positive electrode is formed by combining and mixing desired components of the electrode followed by dispensing a quantity of the mixture into the open end of the container and then using a ram to mold the mixture into a solid tubular configuration that defines a cavity within the container in which the separator 14 and first electrode 18 are later disposed. Second electrode 12 has a ledge 30 and an interior surface 32 as illustrated in FIG. 1. Alternatively, the positive electrode may be formed by pre-forming a plurality of rings from the mixture comprising substituted R—$MnO_2$ and then inserting the rings into the container to form the tubular-shaped second electrode. The cell shown in FIG. 1 would typically include 3 or 4 rings.

The positive electrode can include other components such as a conductive material, for example graphite, that when mixed with the substituted R—$MnO_2$ provides an electrically conductive matrix substantially throughout the positive electrode. Conductive material can be natural, i.e., mined, or synthetic, i.e., manufactured. In one embodiment, the cells include a positive electrode having an active material or oxide to carbon ratio (O:C ratio) that ranges from about 12 to about 14. Too high of an oxide to carbon ratio decreases the container to cathode resistance, which affects the overall cell resistance and can have a potential effect on high rate tests, such as the DSC test, or higher cut-off voltages. Furthermore the graphite can be expanded or non-expanded. Suppliers of graphite for use in alkaline batteries include Timcal America of Westlake, Ohio; Superior Graphite Company of Chicago, Ill.; and Lonza, Ltd. of Basel, Switzerland. Conductive material is present generally in an amount from about 5 to about 10 weight percent based on the total weight of the positive electrode. Too much graphite can reduce substituted R—$MnO_2$ input, and thus cell capacity; too little graphite can increase container to cathode contact resistance and/or bulk cathode resistance. An example of an additional additive is barium sulfate ($BaSO_4$), which is commercially available from Bario E. Derivati S.p.A. of Massa, Italy. The barium sulfate is present in an amount generally from about 1 to about 2 weight percent based on the total weight of the positive electrode. Other additives can include, for example, barium acetate, titanium dioxide, binders such as coathylene, and calcium stearate.

In one embodiment, the positive electrode component (substituted R—$MnO_2$), conductive material, and barium sulfate are mixed together to form a homogeneous mixture. During the mixing process, an alkaline electrolyte solution, such as from about 37% to about 40% KOH solution, is evenly dispersed into the mixture thereby insuring a uniform distribution of the solution throughout the positive electrode materials. The mixture is then added to the container and molded utilizing a ram. Moisture within the container and positive electrode mix before and after molding, and components of the mix are preferably optimized to allow quality positive electrodes to be molded. Mix moisture optimization allows positive electrodes to be molded with minimal splash and flash due to wet mixes, as well as spalling and excessive tool wear due to dry mixes, with optimization helping to achieve a desired high cathode weight. Moisture content in the positive electrode mixture can affect the overall cell electrolyte balance and has an impact on high rate testing.

One of the parameters utilized by cell designers characterizes cell design as the ratio of one electrode's electrochemical capacity to the opposing electrode's electrochemical capacity, such as the anode (A) to cathode (C) ratio, i.e., A:C ratio. For an LR6 type alkaline primary cell that utilizes zinc in the negative electrode or anode and R—$MnO_2$ in the positive electrode or cathode, the A:C ratio is preferably greater than 1.32:1, desirably greater than 1.34:1, and preferably 1.36:1 for impact molded positive electrodes. The A:C ratio for ring molded positive electrodes can be lower, such as about 1.2:1 to about 1.1:1.

Separator 14 is provided in order to separate first electrode 18 from second electrode 12. Separator 14 maintains a physical dielectric separation of the positive electrode's electrochemically active material from the electrochemically active material of the negative electrode and allows for transport of ions between the electrode materials. In addition, the separator acts as a wicking medium for the electrolyte and as a collar that prevents fragmented portions of the negative electrode from contacting the top of the positive electrode. Separator 14 can be a layered ion permeable, non-woven fibrous fabric. A typical separator usually includes two or more layers of paper. Conventional separators are usually formed either by pre-forming the separator material into a cup-shaped basket that is subsequently inserted under the cavity defined by second electrode 12 and closed end 24 and any positive electrode material thereon, or forming a basket during cell assembly by inserting two rectangular sheets of separator into the cavity with the material angularly rotated 90° relative to each other. Conventional pre-formed separators are typically made up of a sheet of non-woven fabric rolled into a cylindrical shape that conforms to the inside walls of the second electrode and has a closed bottom end.

All of the references cited above, as well as all references cited herein, are incorporated herein by reference in their entireties.

While embodiments have been illustrated and described in detail above, such illustration and description are to be considered illustrative or exemplary and not restrictive. It will be understood that changes and modifications may be made by those of ordinary skill within the scope and spirit of the following claims. In particular, embodiments include any combination of features from different embodiments described above and below.

The embodiments are additionally described by way of the following illustrative non-limiting examples that provide a better understanding of the embodiments and of its many advantages. The following examples are included to demonstrate preferred embodiments. It should be appreciated by those of skill in the art that the techniques disclosed in the examples which follow represent techniques used in the embodiments to function well in the practice of the embodiments, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the embodiments.

Discussion and Examples

It is well-known that $LiMn_2O_4$, a spinel, could be converted into different phases after delithiation in acid solutions. For example, D. Larcher et al (J. Electrochemical Society, 145, 3392 (1998)) has shown that different acid-leaching treatments could yield a lambda and/or ramsdellite phase of $MnO_2$ depending upon the treatment time and temperatures. For a substituted spinel, such as $LiMn_{1.96}1Ti_{0.04}O_{3.96}S_{0.04}$, the resultant phases will also depend upon the alternate elements, the percentage of the alternate elements, the acid types, acid concentration and other factors, in addition to the treatment time and temperature.

Partial or full conversion of substituted lambda $MnO_2$ to R—$MnO_2$ will increase the $MnO_2$'s stability and electrochemical performance, as discussed below and shown in the accompanying figures. The optimized degree of conversion for performance from lambda to ramsdellite depends upon the alternate elements, the percentage of the alternate elements and other factors. The degree of conversion could be controlled by varying the acid type, acid concentration, acid wash time, temperature and by other means. The degree of conversion increases with the increase in acid wash temperature, time, and/or concentration. For example, the degree of conversion could be increased by increasing the acid. The acid treatments could be a single step or a multiple-step process, in which the temperature in each step is different, the temperature increases from low to high. The major advantage of ramsdellite over lambda is that the ramsdellite is much stable than lambda in alkaline electrolytes.

Solubility/Stability Testing

Stability studies in aqueous alkaline electrolyte utilized a 37 wt % KOH solution. The solubility and stability of substituted R—$MnO_2$ was tested in this solution. The substituted R—$MnO_2$ had a formula of $Li_{0.0001}Mn_{0.980}Ti_{0.020}(O_{0.991}S_{0.009})_2$. In this testing, 0.5 g of substituted R—$MnO_2$ was added to 5 mL of 37 wt % KOH saturated with ZnO. It was stored in capped polyethylene vials for various lengths of time. The 37% KOH solution was analyzed for soluble manganese content at time intervals of 1, 2, 3, 4, 6, 8, and 10 weeks. The substituted R—$MnO_2$ was compared to an unsubstituted $\lambda$-$MnO_2$ sample and an EMD sample tested in the same manner. This substituted R—$MnO_2$ was synthesized with a 3-step acid wash at 21° C., 99° C., and 104° C., respectively. Each of these steps involved 2.5M $H_2SO_4$ for 16 hours followed by water neutralization to pH>5.5, filtration, and drying between each step.

Figure 2:
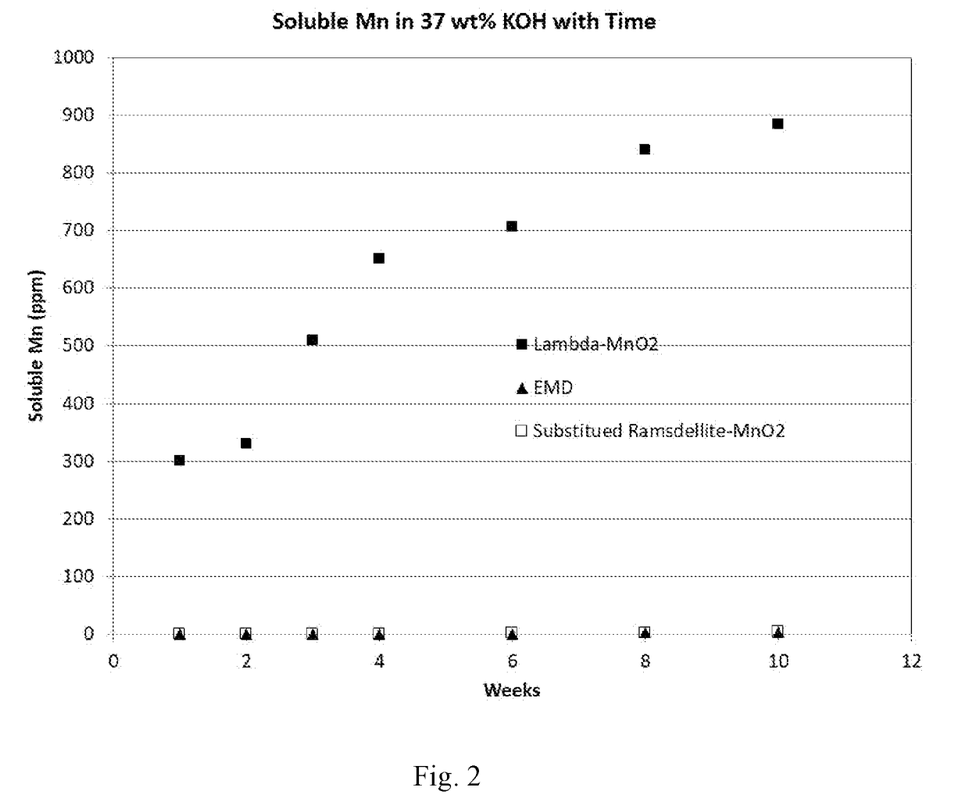
FIG. 2 is a graph showing solubility of substituted R—$MnO_2$ compared to $\lambda$-$MnO_2$ and EMD.

The results of the solubility testing may be seen in FIG. 2. The substituted R—$MnO_2$ is represented by the data points which are hollow squares, the $\lambda$-$MnO_2$ by the solid squares, and the EMD by the triangles. It is seen that the $\lambda$-$MnO_2$ has already started to release soluble Mn into solution at the Week 1 timepoint, and continues to do so throughout the remainder of the 10 week period. The substituted R—$MnO_2$ and the EMD, on the other hand, did not release any soluble Mn into solution during the entirety of the 10 weeks. In other words, it is evident that the substituted R—$MnO_2$ is more stable in solution, and less soluble, than the $\lambda$-$MnO_2$.

Electrochemical Testing

High rate (100 mA/g $MnO_2$) constant current discharge was utilized to ascertain the electrochemical quality of the same substituted R—$MnO_2$ evaluated in the prior experiment. This measurement was performed on an Arbin test unit. The test vehicle was a flooded half-cell. Typical cathode contents included 45 wt % active material, 45 wt % Timcal KS-6 graphite conductor and 10 wt % KOH (37 wt % KOH). The electrolyte used was also 37% KOH.

Figure 3:
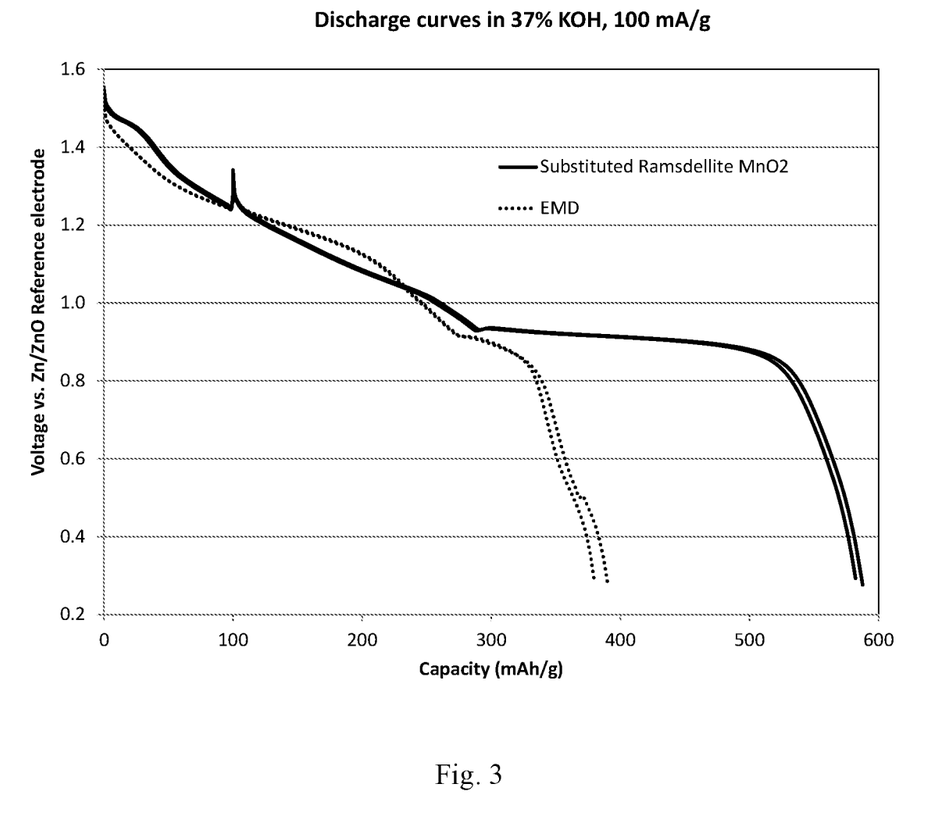
FIG. 3 shows discharge curves for half-cells comprising R—$MnO_2$ compared to EMD.

The results may be seen in FIG. 3, along with a comparative discharge for EMD (showing two curves for each of the substituted R—$MnO_2$ and the EMD). The horizontal axis is expressed in ampere-hours per gram, allowing the normalization of the curves for differing sample weights. The vertical axis shows the cell voltages during discharge, vs a Zn/ZnO reference electrode. The resulting discharge curves show that the substituted R—$MnO_2$ each operated at a similar voltage as the EMD for a portion of the discharge, but had significantly higher total ampere-hour capacity than the EMD.

Many modifications and other embodiments will come to mind to one skilled in the art to which these embodiments pertain having the benefit of the teachings presented in the foregoing descriptions and the associated drawings. Therefore, it is to be understood that the embodiments are not to be limited to the specific embodiments disclosed and that modifications and other embodiments are intended to be included within the scope of the appended claims and list of embodiments disclosed herein. Although specific terms are employed herein, they are used in a generic and descriptive sense only and not for purposes of limitation. For the embodiments described in this application, each embodiment disclosed herein is contemplated as being applicable to each of the other disclosed embodiments.

What is claimed is:

1. Substituted R—$MnO_2$, having at least one alternate cation substituted for a portion of the Mn or at least one alternate anion substituted for a portion of the O; wherein
   i) the substituted R—$MnO_2$ has the formula $(Li_{1-v}A_v)_z(Mn_{1-x}M_x)O_{2-(w/2)}AS_{(t/2)}$, wherein $0 \leq x \leq 0.5$, $0 \leq v \leq 0.1$, $0 \leq z \leq 0.10$, and $0 \leq t \leq w \leq 0.2$, wherein M, if present, is the alternate cation; wherein A, if present, is an alkali metal; and wherein AS, if present, is the alternate anion, and is S, F, N, a halogen, or any element that can be isoelectronic to $O^{2-}$; or
   ii) the substituted R—$MnO_2$ has the formula $(Li_{1-v}A_v)_z(Mn_{1-x-y}M1_xM2_y)O_{2-(w/2)}AS_{(t/2)}$, wherein $0 < (x+y) \leq 0.5$, $0 \leq v \leq 0.1$, $0 \leq z \leq 0.10$, and $0 \leq t \leq w \leq 0.2$, wherein M1 and M2 are each an alternate cation; wherein M1 is different from M2; wherein A, if present, is an alkali metal; and wherein AS, if present, is S, F, N, a halogen, or any element that can be isoelectronic to $O^{2-}$.

2. The substituted R—$MnO_2$ of claim 1, wherein $z \leq 0.05$.

3. The substituted R—$MnO_2$ of claim 1, wherein at least one alternate cation is present, and each alternate cation, if present, is selected from the group consisting of Al, B, Co, Cr, Cu, Fe, Ga, Li, Nb, Ni, Mg, Ru, Ti, V, and Zn, and A is selected from the group consisting of Na, K, Rb, and C.

4. A primary alkaline electrochemical cell, comprising:
   a) a container; and
   b) an electrode assembly disposed within the container and comprising a positive electrode, a negative electrode, a separator located between the positive electrode and the negative electrode, and an alkaline electrolyte,
   wherein the negative electrode comprises zinc, and
   wherein the positive electrode comprises the substituted R—$MnO_2$ of claim 1 having the formula $(Li_{1-v}A_v)_z(Mn_{1-x}M_x)O_{2-(w/2)}AS_{(t/2)}$, wherein $0 \leq x \leq 0.5$, $0 \leq v \leq 0.1$, $0 \leq z \leq 0.10$, and $0 \leq t \leq w \leq 0.2$, wherein M, if present, is the alternate cation; wherein A, if present, is an alkali metal; and wherein AS, if present, is the alternate anion, and is S, F, N, a halogen, or any element that can be isoelectronic to $O^{2-}$.

5. A method of producing the substituted R—MnO$_2$ of claim 1, comprising
   i) providing a substituted spinel; and
   ii) suspending the substituted spinel in aqueous acid, so as to produce the substituted R—MnO$_2$.

6. The method of claim 5, wherein the substituted spinel has the formula $(Li_{1-v}A_v)(Mn_{2-2x}M_{2x})O_{4-w}AS_t$, wherein $0 \le x \le 0.5$, $0 \le v \le 0.1$, and $0 \le t \le w \le 0.2$; and wherein M, if present, is selected from the group consisting of Al, B, Co, Cr, Cu, Fe, Ga, Li, Nb, Ni, Mg, Ru, Ti, V, and Zn; A, if present, is selected from the group consisting of Na, K, Rb, and Cs; and AS, if present, is selected from the group consisting of S, F, N, and halogens; or
   wherein the substituted spinel has the formula $(Li_{1-v}A_v)(Mn_{2-2x-2y}M1_{2x}M2_{2y})O_{4-w}AS_t$, wherein $0 < (x+y) \le 0.5$, $0 \le v \le 0.1$, and $0 \le t \le w \le 0.2$; wherein M1 and M2 are each an alternate cation; wherein M1 is different from M2; wherein A, if present, is an alkali metal; and wherein AS, if present, is selected from the group consisting of S, F, N, and halogens.

7. A primary alkaline electrochemical cell, comprising:
   a) a container; and
   b) an electrode assembly disposed within the container and comprising a positive electrode, a negative electrode, a separator located between the positive electrode and the negative electrode, and an alkaline electrolyte,
   wherein the positive electrode comprises the substituted R—MnO$_2$ of claim 1 having the formula $(Li_{1-v}A_v)_z(Mn_{1-x-y}M1_xM2_y)O_{2-(w/2)}AS_{(t/2)}$, wherein $0 < (x+y) \le 0.5$, $0 \le v \le 0.1$, $0 \le z \le 0.10$, and $0 \le t \le w \le 0.2$, wherein M1 and M2 are each an alternate cation; wherein M1 is different from M2; wherein A, if present, is an alkali metal; and wherein AS, if present, is S, F, N, a halogen, or any element that can be isoelectronic to $O^{2-}$.

8. The substituted R—MnO$_2$ of claim 1, wherein the substituted R—MnO$_2$ comprises lithium.

9. The substituted R—MnO$_2$ of claim 1, wherein the substituted R—MnO$_2$ comprises oxygen vacancies.

10. The substituted R—MnO$_2$ of claim 1, wherein the substituted R—MnO$_2$ comprises an alternate anion.

11. The substituted R—MnO$_2$ of claim 1, wherein A is present.

12. The substituted R—MnO$_2$ of claim 11, wherein A is selected from the group consisting of Na, K, Rb, and Cs.

13. A method of producing a substituted R—MnO$_2$, having at least one alternate cation substituted for a portion of the Mn or at least one alternate anion substituted for a portion of the O, said method comprising
   i) providing a substituted λ-MnO$_2$, having at least one alternate cation substituted for a portion of the Mn or at least one alternate anion substituted for a portion of the O; and
   ii) suspending the substituted λ-MnO$_2$ in aqueous acid, so as to produce the substituted R—MnO$_2$; wherein
      i) the substituted λ-MnO$_2$ has the formula $(Li_{1-v}A_v)_{z'}(Mn_{1-x}M_x)O_{2-(w/2)}AS_{(t/2)}$, wherein $0 \le x \le 0.5$, $0 \le v \le 0.1$, $0 \le z' \le 0.05$, and $0 \le t \le w \le 0.2$; wherein M, if present, is the alternate cation, M is selected from the group consisting of Al, B, Co, Cr, Cu, Fe, Ga, Li, Nb, Ni, Mg, Ru, Ti, V, and Zn; A, if present, is selected from the group consisting of Na, K, Rb, and Cs; and AS, if present, is selected from the group consisting of S, F, N, and halogens; or
      ii) the substituted λ-MnO$_2$ has the formula $(Li_{1-v}A_v)_{z'}(Mn_{1-x-y}M1_xM2_y)O_{2-(w/2)}AS_{(t/2)}$, wherein $0 < (x+y) \le 0.5$, $0 \le v \le 0.1$, $0 \le z' \le 0.10$, and $0 \le t \le w \le 0.2$, wherein M1 and M2 are each an alternate cation; wherein M1 is different from M2; wherein A, if present, is an alkali metal; and wherein AS, if present, is selected from the group consisting of S, F, N, and halogens.

14. The method of claim 12, further comprising suspending a spinel having the chemical formula $(Li_{1-v}A_v)(Mn_{2-2x-2y}M1_{2x}M2_{2y})O_{4-w}AS_t$ in an aqueous acid, so as to produce the substituted λ-MnO$_2$ having the formula $(Li_{1-v}A_v)_z(Mn_{1-x}M_x)O_{2-(w/2)}AS_{(t/2)}$.

15. The method of claim 12, further comprising suspending a spinel having the chemical formula $(Li_{1-v}A_v)_z(Mn_{1-x}M_x)O_{2-(w/2)}AS_{(t/2)}$ in an aqueous acid, so as to produce the substituted λ-MnO$_2$ having the formula $(Li_{1-v}A_v)_z(Mn_{1-x-y}M1_xM2_y)O_{2-(w/2)}AS_{(t/2)}$.

16. The method of claim 13, wherein
   i) the substituted R—MnO$_2$ has the formula $(Li_{1-v}A_v)_z(Mn_{1-x}M_x)O_{2-(w/2)}AS_{(t/2)}$, wherein $0 \le x \le 0.5$, $0 \le v \le 0.1$, $0 \le z \le 0.05$, and $0 \le t \le w \le 0.2$; and wherein M, if present, is selected from the group consisting of Al, B, Co, Cr, Cu, Fe, Ga, Li, Nb, Ni, Mg, Ru, Ti, V, and Zn; A, if present, is selected from the group consisting of Na, K, Rb, and Cs; and AS, if present, is selected from the group consisting of S, F, N, and halogens; or
   ii) wherein the substituted R—MnO$_2$ has the formula $(Li_{1-v}A_v)_z(Mn_{1-x-y}M1_xM2_y)O_{2-(w/2)}AS_{(t/2)}$, wherein $0 < (x+y) \le 0.5$, $0 \le v \le 0.1$, $0 < z \le 0.10$, and $0 \le t \le w \le 0.2$, wherein M1 and M2 are each an alternate cation wherein M1 is different from M2; wherein A, if present, is an alkali metal; and wherein AS, if present, is selected from the group consisting of S, F, N, and halogens.

17. The substituted R—MnO$_2$ produced by the method of claim 13.

* * * * *

UNITED STATES PATENT AND TRADEMARK OFFICE
CERTIFICATE OF CORRECTION

PATENT NO. : 11,133,499 B2
APPLICATION NO. : 16/414103
DATED : September 28, 2021
INVENTOR(S) : Zheng et al.

Page 1 of 1

It is certified that error appears in the above-identified patent and that said Letters Patent is hereby corrected as shown below:

In the Claims

Column 16,
Lines 50 and 51, Claim 3 delete ", and A is selected from the group consisting of Na, K, Rb, and C".

Column 18,
Lines 23, Claim 14 and 28, Claim 15 "claim 12" should read --claim 13--;
Lines 29 and 30, Claim 15 the chemical formula should read --$(Li_{1-v}A_v)(Mn_{2-2x-2y}M1_{2x}M2_{2y})O_{4-w}AS_t$--;
Line 45, Claim 16 "alternate cation" should read --alternate cation;--.

Signed and Sealed this
Ninth Day of August, 2022

Katherine Kelly Vidal
*Director of the United States Patent and Trademark Office*